United States Patent
Keränen et al.

(10) Patent No.: US 10,945,125 B2
(45) Date of Patent: Mar. 9, 2021

(54) METHODS AND APPARATUS FOR COMMUNICATION

(71) Applicant: Telefonaktiebolaget LM Ericsson (publ), Stockholm (SE)

(72) Inventors: Ari Keränen, Helsinki (FI); Per Ståhl, Klagshamn (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 33 days.

(21) Appl. No.: 16/334,413

(22) PCT Filed: Sep. 21, 2016

(86) PCT No.: PCT/EP2016/072462
§ 371 (c)(1),
(2) Date: Mar. 19, 2019

(87) PCT Pub. No.: WO2018/054463
PCT Pub. Date: Mar. 29, 2018

(65) Prior Publication Data
US 2019/0223010 A1  Jul. 18, 2019

(51) Int. Cl.
*H04W 12/00* (2009.01)
*H04L 29/06* (2006.01)
(Continued)

(52) U.S. Cl.
CPC ....... *H04W 12/001* (2019.01); *H04L 63/0428* (2013.01); *H04L 63/0435* (2013.01);
(Continued)

(58) Field of Classification Search
None
See application file for complete search history.

(56) References Cited

U.S. PATENT DOCUMENTS

| 2008/0098129 A1* | 4/2008 | Niddam | H04W 28/06 709/247 |
| 2009/0003347 A1* | 1/2009 | Yang | H04L 47/2475 370/392 |

(Continued)

FOREIGN PATENT DOCUMENTS

| WO | 03073667 A1 | 9/2003 |
| WO | 2004034651 A1 | 4/2004 |

OTHER PUBLICATIONS

Bormann, et al., "6LoWPAN-GHC: Generic Header Compression for IPv6 over Low-Power Wireless Personal Area Networks (6LoWPANs)", Internet Engineering Task Force (IETF), RFC 7400, Category: Standards Track, ISSN:2070-1721, Nov. 2014, 24 pages.
(Continued)

*Primary Examiner* — Saumit Shah
(74) *Attorney, Agent, or Firm* — Murphy, Bilak & Homiller, PLLC

(57) ABSTRACT

Methods for communication for a device and a transport node are disclosed, the transport node facilitating communication between the device and a server. The method (100) for the device comprises assembling a message for sending to the server via the transport node (120), the message comprising a message payload, an application layer header, and a signature, wherein at least one of the message payload or a part of the application layer header is encrypted. The method further comprises retrieving a compression context identifier corresponding to the application layer header (130), replacing the application layer header in the message with the retrieved compression context identifier (140) and forwarding the message to the transport node (150). The method (200) for the transport node comprises retrieving an application layer header corresponding to the compression context identifier (220), and replacing the compression con-
(Continued)

text identifier in the message with the retrieved application layer header (230).

13 Claims, 12 Drawing Sheets

(51) Int. Cl.
    *H04W 12/10*     (2021.01)
    *H04W 28/06*     (2009.01)
    *H04W 88/02*     (2009.01)

(52) U.S. Cl.
    CPC .............. *H04L 69/04* (2013.01); *H04L 69/22* (2013.01); *H04W 12/005* (2019.01); *H04W 12/0013* (2019.01); *H04W 12/1006* (2019.01); *H04W 28/065* (2013.01); *H04W 88/023* (2013.01); *H04L 63/123* (2013.01)

(56) References Cited

U.S. PATENT DOCUMENTS

| | | | | |
|---|---|---|---|---|
| 2014/0143855 A1* | 5/2014 | Keoh | ................ | H04L 63/123 726/14 |
| 2015/0281196 A1* | 10/2015 | Sharma | ................ | H04L 51/12 713/151 |
| 2016/0142518 A1* | 5/2016 | Raina | ................ | H04W 28/06 370/230 |
| 2017/0012778 A1* | 1/2017 | Choyi | ................ | H04L 9/0861 |
| 2017/0126850 A1* | 5/2017 | Mosko | ................ | H04L 69/04 |
| 2017/0195735 A1* | 7/2017 | Kaliamoorthi | ... | H04N 21/42203 |

OTHER PUBLICATIONS

Bormann, et al., "Terminology for Constrained-Node Networks", Internet Engineering Task Force (IETF), RFC: 7228, Category: Informational, ISSN: 2070-1721, May 2014, 17 pages.

Dierks, et al., "The Transport Layer Security (TLS) Protocol Version 1.2", Network Working Group, RFC 5246, Standards Track, Aug. 2008, 104 pages.

Hui, et al., "Compression Format for IPv6 Datagrams over IEEE 802.15.4-Based Networks", Internet Engineering Task Formce (IETF), RFC 6282, Category: Standards Track, ISSN: 2070-1721, Sep. 2011, 24 pages.

Jonsson, et al., "The RObust Header Compression (ROHC) Framework", Network Working Group, RFC 4995, Category: Standards Track, Jul. 2007, 40 pages.

Rescorla, et al., "Datagram Transport Layer Security Version 1.2", Internet Engineering Task Force (IETF), RFC 6347, Obsoletes: 4347, Category: Standards Track, ISSN: 2070-1721, Jan. 2012, 32 pages.

Selander, et al., "Object Security of CoAP (OSCOAP) draft-selander-ace-object-security-04", ACE Working Group, Internet-Draft, Intended status: Standards Track, https://tools.ietf.org/html/draft-selander-ace-object-security-04, Mar. 21, 2016, 34 pages.

Shelby, et al., "The Constrained Application Protocol (CoAP)", Internet Engineering Task Force (IETF), Request for Comments: 7252; Category: Standards Track; ISSN:2070-1721, https://tools.ietf.org/html/rfc7252, Jun. 2014, 112 pages.

* cited by examiner

METHODS AND APPARATUS FOR COMMUNICATION

TECHNICAL FIELD

The present disclosure relates to a method performed in a device configured for communication with a server via a transport node of a communication network, and to a method performed in a transport node of such a communication network. The present disclosure also relates to a system for communication between a device and a server over a communication network, and to a device, a transport node and to a computer program and a computer program product configured, when run on a computer, to carry out methods performed in a device and a transport node.

BACKGROUND

The "Internet of Things" (IoT) refers to devices enabled for communication network connectivity, so that these devices may be remotely managed, and data collected or required by the devices may be exchanged between individual devices and between devices and application servers. Such devices are often subject to severe limitations on processing power, storage capacity, energy supply, device complexity and/or network connectivity, imposed by their operating environment or situation, and may consequently be referred to as constrained devices. Many constrained devices may not be equipped with long range radio capabilities, and may be unable to connect directly to the Internet. Constrained devices may instead connect to a gateway or border router using for example low power (and low-bitrate) radio, the gateway having long range (for example 3GPP) radio capability and credentials for global connectivity. The Constrained Application Protocol (CoAP), as defined in RFC7252, is commonly used as the application layer protocol for IoT when communicating with constrained IoT devices.

Many wireless networks designed for IoT use cases employ very small frame sizes and require efficient compression of IP, transport and even application headers to allow the IP stack to be used. Examples of such networks include Low-Rate Wireless Personal Area Networks (LR-WPANs) as defined in IEEE 802.15.4, and Low Power Wide Area Networks (LPWANs) such as SigFox or LoRa. Compression mechanisms such as 6LoWPAN/6lo as defined in RFC6282, Robust Header Compression (RoHC) as defined in RFC4995, and Generic Header Compression as defined in RFC7400, can be used to enable IP communication in wireless networks for IoT use cases.

In order to prevent tampering of application layer sensitive data, and to avoid leakage of sensitive data, end-to-end security may be required between two communicating parties such as an IoT device and a server in the Internet to which the IoT device reports data. Two different methods for end-to-end security are commonly used in IoT scenarios: Transport Layer Security (TLS), including its datagram variant DTLS, as defined in RFC5246 and RFC 6347 respectively, and Object Security, which is based on protecting data objects at the application layer.

The Constrained Application Protocol (CoAP) specifies the use of DTLS for security between a CoAP client and a CoAP server. A disadvantage of DTLS is that it is unable to support the use of intermediary nodes, and work is therefore ongoing to define an Object Security solution for CoAP, known as OSCOAP and introduced in the IETF Internet Draft "Object Security for CoAP". OSCOAP aims to enable end-to-end security between two endpoints with the use of intermediate devices. Such devices may cache messages for later transmission, for example to allow for intermittent network connectivity or devices periodically entering a low activity sleep mode.

Regardless of the security solution used, an issue remains that if end-to-end transport layer security is used for protection of application data, then application layer headers are encrypted, and the application layer cannot therefore be compressed and decompressed with the help of the network. As discussed above, such compression is desirable in view of the very small frame sizes used in many wireless networks for IoT.

SUMMARY

It is an aim of the present disclosure to provide a method and apparatus which enable compression of application layer headers in messages which may be at least partially encrypted and which may be exchanged between a device and a transport node of a communication network.

According to a first aspect of the present disclosure, there is provided a method in a device configured for communication with a server via a transport node of a communication network. The method comprises assembling a message for sending to the server via the transport node, the message comprising a message payload, an application layer header, and a signature prepared over the message payload and application layer header. At least one of the message payload or a part of the application layer header is encrypted. The method further comprises retrieving a compression context identifier corresponding to the application layer header, replacing the application layer header in the message with the retrieved compression context identifier, and forwarding the message to the transport node.

In some examples of the present disclosure, in which a part of the application layer header is encrypted, the encrypted part of the application layer header may comprise header Options.

In some examples of the present disclosure, the device may comprise a constrained device. The transport node may comprise a border router, and may provide Internet access to the constrained device. The constrained device may in some examples be one of a plurality of constrained devices forming a constrained network.

For the purposes of the present disclosure, a constrained device comprises a device which conforms to the definition set out in section 2.1 of RFC 7228 for "constrained node". According to the definition in RFC 7228, a constrained device is a device in which "some of the characteristics that are otherwise pretty much taken for granted for Internet nodes at the time of writing are not attainable, often due to cost constraints and/or physical constraints on characteristics such as size, weight, and available power and energy. The tight limits on power, memory, and processing resources lead to hard upper bounds on state, code space, and processing cycles, making optimization of energy and network bandwidth usage a dominating consideration in all design requirements. Also, some layer-2 services such as full connectivity and broadcast/multicast may be lacking. Constrained devices are thus clearly distinguished from server systems, desktop, laptop or tablet computers and powerful mobile devices such as smartphones. A constrained device may for example comprise a Machine Type Communication device, a battery powered device or any other device having the above discussed limitations. Examples of constrained devices may include sensors measuring temperature, humidity and gas content while goods are transported and stored, motion sensors for controlling light bulbs, sensors measuring light that can be used to control shutters, heart rate monitor and other sensors for personal health (continuous monitoring of blood pressure etc.) and connected electronic door locks.

For the purposes of the present disclosure, a constrained network comprises a network in which at least some of the network devices are constrained devices as defined above.

In some examples of the present disclosure, the selected application layer header may comprise a Constrained Application Protocol (CoAP) header. In some examples of the present disclosure, the signature may comprise a Message Authentication Code (MAC).

In some examples of the present disclosure, the message payload, signature and at least part of the application layer header may be assembled as a protected data object. In examples of the disclosure in which at least a part of the application layer header is encrypted, the encrypted part of the application layer header may be included as part of the protected data object.

In some examples of the present disclosure, the method may further comprise assembling a plurality of application layer headers for use in messages to be sent to the server, assigning compression context identifiers to the assembled application layer headers, and communicating the assembled application layer headers and compression context identifiers to the transport node.

In some examples of the present disclosure, the method may further comprise encrypting at least a part of at least some of the assembled application layer headers. In some examples, the encrypted parts of the application layer headers may comprise header Options.

In some examples of the present disclosure, the method may further comprise storing a local copy of the assembled application layer headers and assigned compression context identifiers. In some examples, of the present disclosure, assembling the message may therefore comprise selecting an application layer header appropriate for the message payload from amongst the application layer headers locally stored.

In some examples of the present disclosure, the assembling of headers, encrypting, assigning context identifiers and communicating headers and context identifiers to the transport node may take place before the step of assembling a message for sending to the server via the transport node and subsequent sets set out above. In further examples, the assembling of headers, encrypting, assigning context identifiers and communicating headers and context identifiers to the transport node may alternatively or additionally take place after the step of assembling a message for sending to the server via the transport node, for example in the case of a renegotiation of compression contexts.

In some examples of the present disclosure, the method may further comprise adding to the message a security association identifier identifying a security association comprising an algorithm and algorithm parameters used for encryption of the encrypted parts of the message. In some examples, the security association may be shared between the device and the server, and the algorithm may additionally be used for integrity protection of at least parts of the message. Examples of algorithm parameters which may be included in the security association include one or more keys, key identifiers, Initialisation Vectors (IVs), and sender and receiver sequence numbers.

In some examples of the present disclosure, the algorithm parameters may include a device sequence number, and the device sequence number may be operable for use in detecting duplicated messages.

In some examples of the present disclosure, both of the message payload and a part of the application layer header may be encrypted.

In some examples of the present disclosure, the message payload and a part of the application layer header may be separately encrypted.

In some examples of the present disclosure, the message payload may be encrypted using at least one of a different algorithm or different parameters to those used for encrypting the encrypted part of the message application layer header.

In some examples of the present disclosure, the application layer header may include an Option indicating that decryption of the message is to be handled differently to decryption of a conventional message, for example requiring the separate decryption of the header and payload. Examples of algorithms which may be used for encryption of message payload and application layer header parts include AES-CCM and AES-CBC. In some examples of the present disclosure, the method may further comprise replacing the payload in the message with a payload context identifier. In some examples of the present disclosure, the payload context identifier and compression context identifier may be combined, for example a byte may be added to the compression context identifier to include the payload context identifier.

In some examples of the present disclosure, the message may further comprise a network layer header and a transport layer header, and the method may further comprise replacing the network layer header and the transport layer header in the message with the retrieved compression context identifier.

In some examples of the present disclosure, the method may further comprise receiving a message from the transport node, the message comprising a message payload, a compression context identifier, and a signature. The method may further comprise retrieving an application layer header corresponding to the compression context identifier and replacing the compression context identifier in the message from the transport node with the retrieved application layer header.

In some examples of the present disclosure, the method may further comprise retrieving a transport layer header and a network layer header corresponding to the compression context identifier, and adding the retrieved network layer header and transport layer header to the message from the transport node.

In some examples of the present disclosure, the message received from the transport node may be one of a plurality of messages received from the transport node, the message forwarded to the transport node may be one of a plurality of messages forwarded to the transport node, and each message forwarded to the transport node and each message received from the transport node may further comprise a sequence number. According to such examples, the method may further comprise processing messages received from the transport node in an order based on their sequence numbers, and identifying from an ordered sequence of received messages and knowledge of an order of messages forwarded to the transport node a relationship between messages forwarded to the transport node and messages received from the transport node.

In some examples of the present disclosure, the relationship may for example comprise an acknowledgement or reset message received by the device in response to a message sent by the device.

According to another aspect of the present disclosure, there is provided a method in a transport node of a communication network, the transport node configured to facilitate communication between a device and a server. The method comprises receiving a message from the device, the message comprising a message payload, a compression context identifier and a signature, and retrieving an application layer header corresponding to the compression context identifier. The method further comprises replacing the compression context identifier in the message with the retrieved application layer header and forwarding the message to the server. At least one of the message payload or a part of the application layer header of the message is encrypted.

In some examples of the present disclosure, the device may be a constrained device and the transport node may be a border router, and may provide Internet access to the constrained device. The constrained device may be one of a plurality of constrained devices forming a constrained network. In some examples of the present disclosure, the retrieved application layer header may comprise a Constrained Application Protocol (CoAP) header and the signature may comprise a Message Authentication Code (MAC).

In some examples of the present disclosure, the message payload and signature may be assembled as a protected data object.

In some examples of the present disclosure, the method may further comprise receiving from the device a plurality of application layer headers and a plurality of compression context identifiers assigned to the application layer headers, and storing the received application layer headers and compression context identifiers in local memory.

In some examples of the present disclosure, retrieving an application layer header corresponding to the compression context identifier in the received message may comprise retrieving from the local memory the application layer header that corresponds to the context identifier in the received message.

In some examples of the present disclosure, the plurality of application layer headers and plurality of compression context identifiers may be received before the message from the device is received. In further examples, the plurality of application layer headers and plurality of compression context identifiers may alternatively or additionally be received after the message from the device is received, for example in the case of a renegotiation of compression contexts.

In some examples of the present disclosure, the message payload in the message received from the device may be replaced by a payload context identifier, and the method may further comprise retrieving a payload corresponding to the payload context identifier and replacing the payload context identifier in the message with the retrieved payload.

In some examples of the present disclosure, the payload context identifier may indicate that the payload of the message is identical to the payload of a specified earlier message, and retrieving a payload corresponding to the payload context identifier may comprise retrieving the payload from the specified earlier message.

In some examples of the present disclosure, the method may further comprise retrieving a transport layer header and a network layer header corresponding to the compression context identifier, and adding the retrieved network layer header and transport layer header to the message.

In some examples of the present disclosure, the method may further comprise determining whether the message received from the device is a confirmable message or a non-confirmable message and, if the message received from the device is a confirmable message or a non-confirmable message, inserting a message identifier into the application layer header retrieved for the message.

In some examples of the present disclosure, the method may further comprise receiving a message from the server for the device, the message comprising a message payload, an application layer header, and a signature prepared over the message payload and application layer header. The method may further comprise retrieving a compression context identifier corresponding to the application layer header, replacing the application layer header in the message with the retrieved compression context identifier, and forwarding the message to the device.

In some examples of the present disclosure, the message from the server may further comprise a network layer header and a transport layer header, and the method may further comprise replacing the network layer header and the transport layer header in the message from the server with the retrieved compression context identifier.

In some examples of the present disclosure, the message received from the device may be one of a plurality of messages received from the device, each of the received messages from the device comprising a sequence number, and the application layer header in the message received from the server may comprise a message identifier and a sequence number. In such examples of the present disclosure, the method may further comprise determining whether the message received from the server is a confirmable message or a non-confirmable message and, if the message received from the server is a confirmable message or a non-confirmable message, storing the message identifier, receiving a new message from the device, the new message comprising a sequence number, and ordering the new message received from the device with previously received messages from the device based on their sequence numbers. The method may further comprise identifying from the order of the received messages from the device a relationship between the message received from the server and the new message received from the device, inserting the stored message identifier into a retrieved application layer header for the new message received from the device, and forwarding the new message received from the device to the server.

In some examples of the present disclosure, the insertion of the message ID into the application layer header of the new message from the device may be carried out only if the message is an acknowledgement message or a reset message. In some examples of the present disclosure, a similar process to that described above may be followed for a token field of the message header in messages received from and sent to the server.

According to another aspect of the present disclosure, there is provided a computer program comprising instructions which, when executed on at least one processor, cause the at least one processor to carry out a method according to any one of the preceding aspects of the present disclosure.

According to another aspect of the present disclosure, there is provided a carrier containing a computer program according to a preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a system for communication between a device and a server over a communication network, the system comprising a device, a server and a transport node of the communication network. The device is configured to assemble a message for sending to the server via the transport node, the message comprising a message payload, an application layer header, and a signature prepared over the message payload and application layer header, wherein at least one of the message payload or a part of the application layer header is encrypted. The device is further configured to retrieve a compression context identifier corresponding to the application layer header, replace the application layer header in the message with the retrieved compression context identifier, and forward the message to the transport node. The transport node is configured to receive the message from the device, retrieve the application layer header corresponding to the compression context identifier, replace the compression context identifier in the message with the retrieved application layer header, and forward the message to the server.

In some examples, the device may be a constrained device and the transport node may be a border router or gateway which may for example provide Internet access for the constrained device. The application layer header may be a CoAP header.

According to another aspect of the present disclosure, there is provided a device configured for communication with a server via a transport node of a communication network, the device comprising a processor and a memory. The memory contains instructions executable by the processor such that the device is operative to assemble a message for sending to the server via the transport node, the message comprising a message payload, an application layer header, and a signature prepared over the message payload and application layer header, wherein at least one of the message payload or a part of the application layer header is encrypted. The device is further operable to retrieve a compression context identifier corresponding to the application layer header, replace the application layer header in the message with the retrieved compression context identifier, and forward the message to the transport node.

In some examples of the present disclosure, the device may be further operative to carry out a method according to a preceding aspect or example of the present disclosure.

According to another aspect of the present disclosure, there is provided a transport node of a communication network, the transport node configured to facilitate communication between a device and a server, the transport node comprising a processor and a memory. The memory contains instructions executable by the processor such that the transport node is operative to receive a message from the device, the message comprising a message payload, a compression context identifier and a signature. The transport node is further operative to retrieve an application layer header corresponding to the compression context identifier, replace the compression context identifier in the message with the retrieved application layer header, and forward the message to the server. At least one of the message payload or a part of the application layer header is encrypted.

In some examples of the present disclosure, the transport node may be further operative to carry out a method according to a preceding aspect or example of the present disclosure.

According to another aspect of the present disclosure, there is provided a device configured for communication with a server via a transport node of a communication network. The device comprises an assembly module for assembling a message for sending to the server via the transport node, the message comprising a message payload, an application layer header, and a signature prepared over the message payload and application layer header, wherein at least one of the message payload or a part of the application layer header is encrypted. The device further comprises a context module for retrieving a compression context identifier corresponding to the application layer header, a compression module for replacing the application layer header in the message with the retrieved compression context identifier, and a transmission module for forwarding the message to the transport node.

In some examples of the present disclosure, the assembly module may also be for assembling a plurality of application layer headers for use in messages to be sent to the server, and the context module may also be for assigning compression context identifiers to the assembled application layer headers. The transmission module may also be for communicating the assembled application layer headers and compression context identifiers to the transport node.

In some examples of the present disclosure, the assembly module may be for encrypting both the message payload and a part of the application layer header, and may be for separately encrypting the message payload and a part of the application layer header.

In some examples of the present disclosure, the message may further comprise a network layer header and a transport layer header, and the compression module may also be for replacing the network layer header and the transport layer header in the message with the retrieved compression context identifier.

In some examples of the present disclosure, the device may further comprise a receiving module for receiving a message from the transport node, the message comprising a message payload, a compression context identifier, and a signature. The context module may also be for retrieving an application layer header corresponding to the compression context identifier, and the compression module may also be for replacing the compression context identifier in the message from the transport node with the retrieved application layer header.

In some examples of the present disclosure, the message received from the transport node may be one of a plurality of messages received from the transport node, and the message forwarded to the transport node may be one of a plurality of messages forwarded to the transport node, and each message forwarded to the transport node and each message received from the transport node may further comprise a sequence number. The device may further comprise a processing module for processing messages received from the transport node in an order based on their sequence numbers, and an identifying module for identifying from an ordered sequence of received messages and knowledge of an order of messages forwarded to the transport node a relationship between messages forwarded to the transport node and messages received from the transport node.

According to another aspect of the present disclosure, there is provided a transport node of a communication network, the transport node configured to facilitate communication between a device and a server. The transport node comprises a receiving module for receiving a message from the device, the message comprising a message payload, a compression context identifier and a signature, and a context module for retrieving an application layer header corresponding to the compression context identifier. The transport node further comprises a compression module for replacing the compression context identifier in the message with the retrieved application layer header, and a transmission module for forwarding the message to the server, wherein at least one of the message payload or a part of the application layer header is encrypted.

In some examples of the present disclosure, the receiving module may also be for receiving from the device a plurality of application layer headers and a plurality of compression context identifiers assigned to the application layer headers, and storing the received application layer headers and compression context identifiers in local memory.

In some examples of the present disclosure, the receiving module may also be for receiving a message from the server for the device, the message comprising a message payload, an application layer header, and a signature prepared over the message payload and application layer header. The context module may also be for retrieving a compression context identifier corresponding to the application layer header and the compression module may also be for replacing the application layer header in the message with the retrieved compression context identifier. The transmission module may also be for forwarding the message to the device.

In some examples of the present disclosure, the message received from the device may be one of a plurality of messages received from the device, each of the received messages from the device comprising a sequence number, and the application layer header in the message received from the server may comprise a message identifier and a sequence number. The transport node may further comprise a processing module for determining whether the message received from the server is a confirmable message or a non-confirmable message; and, if the message received from the server is a confirmable message or a non-confirmable message, storing the message identifier. The receiving module may also be for receiving a new message from the device, the new message comprising a sequence number, and the processing module may also be for ordering the new message received from the device with previously received messages from the device based on their sequence numbers, identifying from the order of the received messages from the device a relationship between the message received from the server and the new message received from the device and inserting the stored message identifier into a retrieved application layer header for the new message received from the device. The transmission module may also be for forwarding the new message received from the device to the server.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Aspects of the present disclosure provide methods according to which application layer header compression may be used in combination with end-to-end security, so providing useful bandwidth savings in constrained networks and increasing operational lifetime of battery powered devices.

Figure 1:
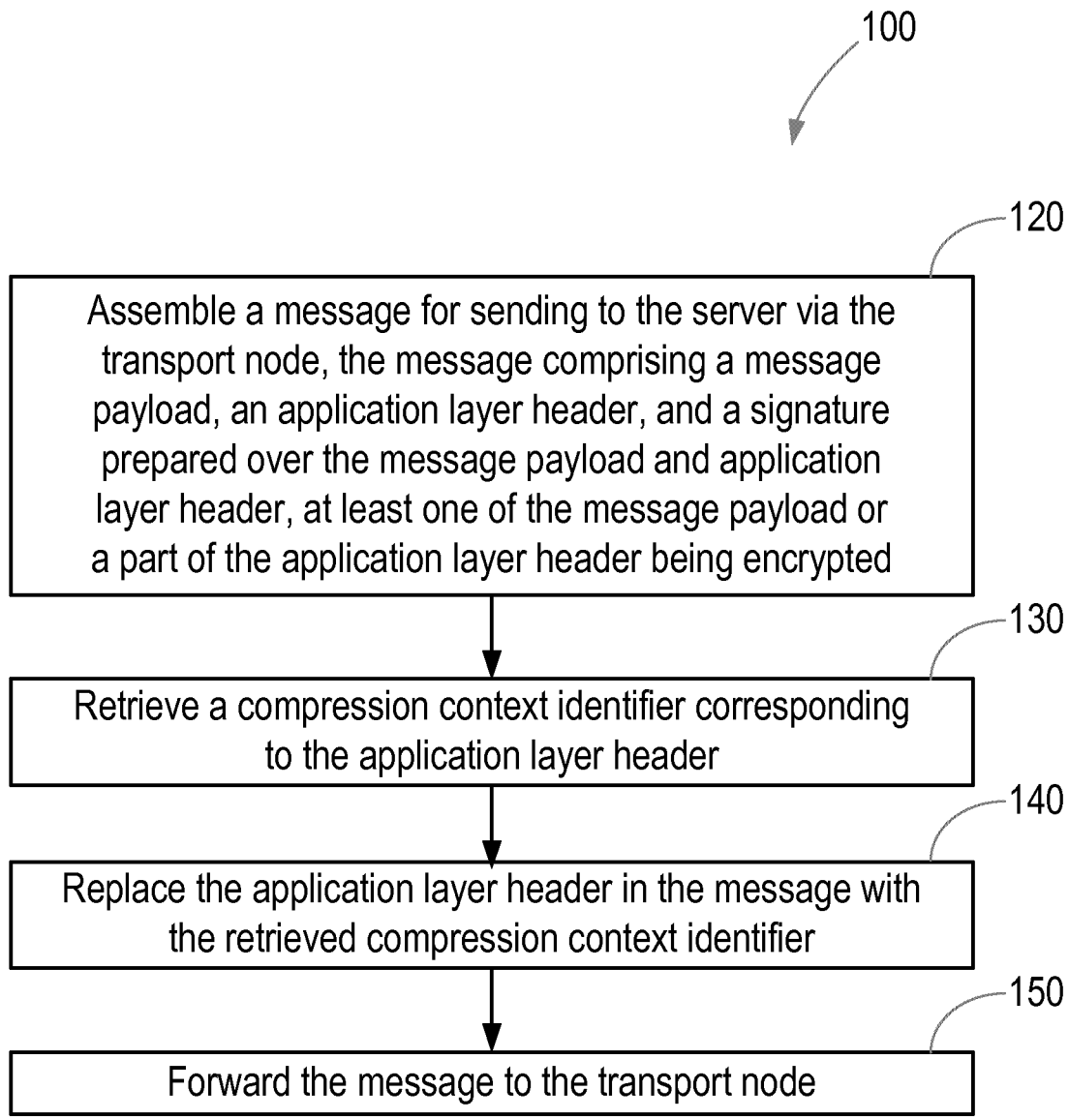
FIG. 1 is a flow chart illustrating process steps in a method in a device configured for communication with a server via a transport node of a communication network.

FIG. 1 illustrates process steps in a method according to an aspect of the present disclosure. The method 100 of FIG. 1 is performed in a device configured for communication with a server via a transport node of a communication network. The device may for example be a constrained device, and the transport node may be a border router providing network connectivity to the constrained device.

Referring to FIG. 1, in a first step 120 the device assembles a message for sending to the server via the transport node, the message comprising a message payload, an application layer header, and a signature prepared over the message payload and application layer header. At least one of the message payload or a part of the application layer header is encrypted. In step 130, the device retrieves a compression context identifier corresponding to the application layer header, and in step 140, the device replaces the application layer header in the message with the retrieved compression context identifier. In step 150, the device forwards the message to the transport node.

Figure 2:
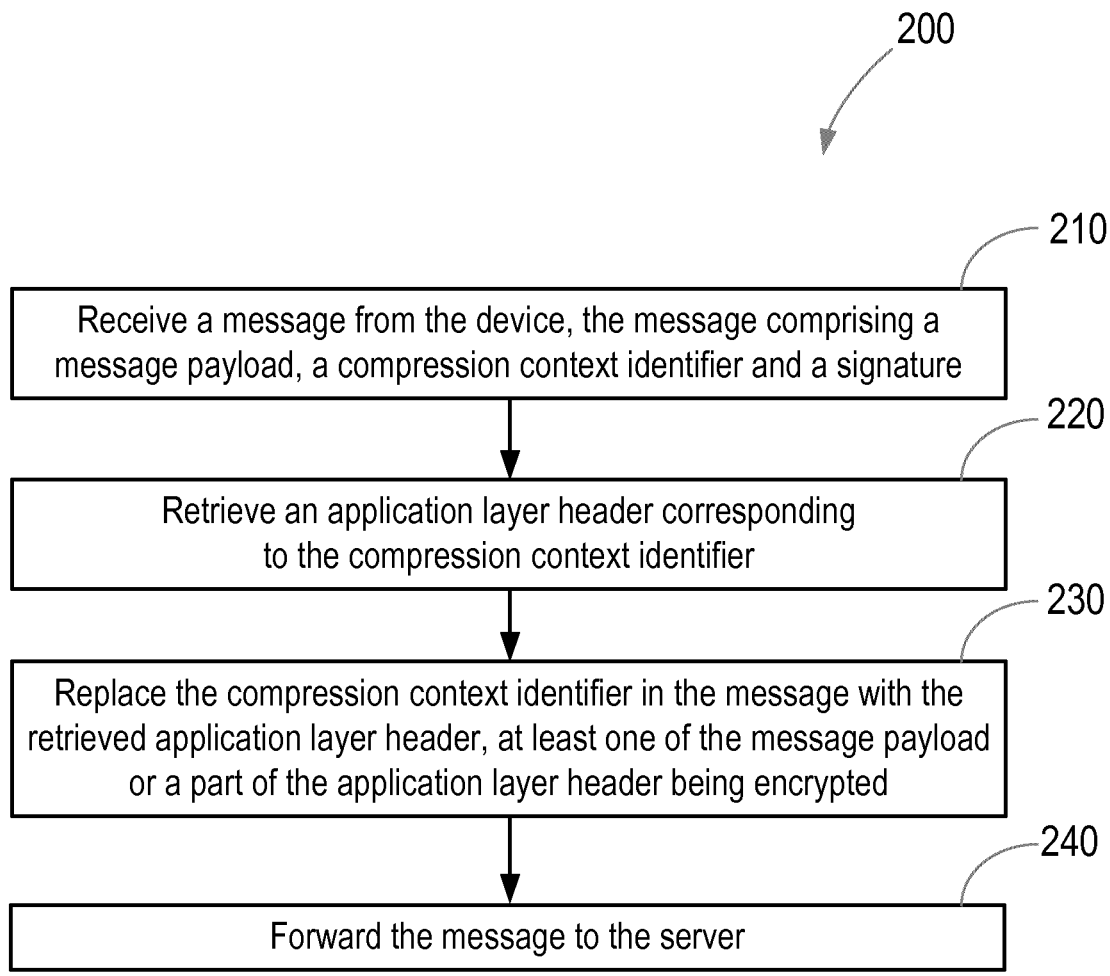
FIG. 2 is a flow chart illustrating process steps in a method in a transport node of a communication network.

FIG. 2 illustrates process steps in a method according to another aspect of the present disclosure. The method 200 of FIG. 2 is performed in a transport node of a communication network, the transport node configured to facilitate communication between a device and a server. The device may be a constrained device, as discussed above, and the transport node may be a border router providing network connectivity to the constrained device. The method 200 comprises steps which are complementary to those of the method 100 performed by the device.

Referring to FIG. 2, in a first step 210, the transport node receives a message from the device, the message comprising a message payload, a compression context identifier and a signature. In step 220, the transport node retrieves an application layer header corresponding to the compression context identifier and in step 230 the transport node replaces the compression context identifier in the message with the retrieved application layer header. At least one of the message payload or a part of the application layer header is encrypted. Finally, the transport node forwards the message to the server.

Methods 100 and 200 together thus enable compression of application layer message headers through the use of a compression context identifier. Compression contexts may be negotiated between the device and the transport node before message exchange, as discussed in further detail below. The message sent and received according to methods 100 and 200 may be a CoAP message, and the message may be end-to-end protected using an Object Security approach. A CoAP message is a message conforming to the Constrained Application Protocol (CoAP), as defined in RFC7252. CoAP messages largely follow the same Request/Response paradigm that is present in HTTP. A CoAP message may be one of four different message types including:
 a Confirmable message, to which a recipient must respond,
 a Non-confirmable message, to which a recipient is not required to respond,
 an Acknowledgement message, indicating successful processing by a recipient of a Confirmable message, and
 a Reset message, sent when a message recipient encounters an error, does not understand the received message or is no longer interested in the message sender.

A brief discussion of Object Security for CoAP messages is provided below, followed by a discussion of additional features that may be included in examples of the methods 100, 200 above according to different examples of the present disclosure. The discussion of additional features uses the example of messages sent using CoAP as application layer protocol, although it will be appreciated that other application layer protocols may be used.

End-to-end protection of CoAP messages using an Object Security approach may involve encryption and/or integrity protection. Encryption, if used, is typically based on a shared symmetric key. Integrity protection may be based on a shared symmetric key or a public-private key pair, according to which the sender uses its private key to sign a message and the receiver uses the corresponding public key to verify the message. Encryption and integrity protection may be combined in one algorithm using one shared symmetric key, in so called authenticated encryption. As an example, in the OSCOAP Internet Draft mentioned above, support for the authenticated encryption algorithm AES-CCM is required. A security association is shared between the communicating parties containing the algorithm or algorithms used for encryption and integrity protection, and parameters needed for those algorithms including for example a key or keys, Initialisation Vector or Vectors (IVs), and sender and receiver sequence numbers. Sequence numbers are used to protect against message replay. A dedicated CoAP header Option may be used to indicate that Object Security is used to protect a message.

Figure 3:
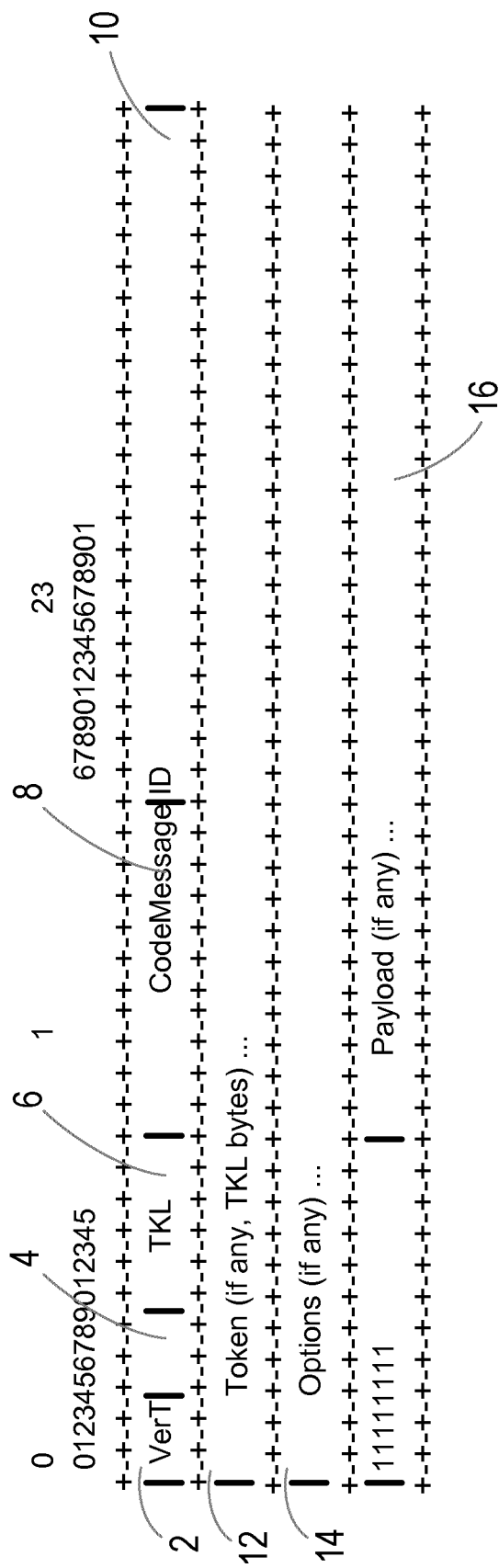
FIG. 3 illustrates message format according to CoAP.

FIG. 3 illustrates the different parts of a CoAP header including Version 2, Type 4, Token Length 6, Code 8, Message ID 10, Token 12, Options 14 and Payload 16. Encryption and integrity protection may be used not only to protect the actual CoAP message payload but also CoAP header parts. For example, the version of the CoAP header and the CoAP message request/response code require integrity protection. CoAP Options may contain privacy sensitive information about location and other data that must be protected against leaks and may require both encryption and integrity protection. Some parts of the CoAP header must neither be encrypted nor integrity protected to allow caching of protected CoAP messages and modifications to these cached messages by proxies. Examples of header parts which must be neither encrypted nor integrity protected include Type, Message ID, Token, and Token length. The encryption and integrity protection of CoAP header and payload is typically combined. One common message integrity checksum (signature or Message Authentication Code, MAC) covers both the header parts and the payload. The OSCOAP Internet Draft uses Concise Binary Object Representation (CBOR) Encoded Message Syntax to describe the protected data.

Sender and receiver sequence numbers are commonly used in CoAP messages to prevent message replay. Typically, each of the two communicating parties uses their own sequence number. The sending party increases their sequence number by one when sending a message. The receiving party keeps track of the highest received sequence number in a message from the sender, and will ignore any message with a sequence number that is smaller than or equal to this number.

According to examples of the present disclosure, the complete CoAP header is removed from CoAP messages and replaced with a compression context identifier (CID) when messages are sent over a constrained network between a device and a transport node. The transport node may be a border router that is providing Internet access to the devices in the constrained network. A number of pre-defined message headers may be exchanged and compression context identifiers established during a context negotiation. On receipt of a message from a device received over the constrained network, the border router can look up the correct message header based on the compression context identifier, and can then insert the correct message header before forwarding the packet on to the Internet. On receipt of a message from a server addressed to the device, the border router can look up the compression context identifier corresponding to the message header and substitute the message header for the compression context identifier before sending the packet on to the constrained network.

For Object Security protected CoAP messages, the message integrity checksum (signature or MAC) depends on the payload. This checksum cannot therefore be compressed and is sent as part of the message over the constrained network. In order to allow for header removal and replacement with the compression context identifier, parts of the CoAP header requiring encryption are encrypted separately from the payload. In some examples, the encrypted parts of the header may be encrypted using a different algorithm and/or different parameters to those used for encryption of the payload. Whether or not different algorithms and/or parameters are used may be governed by convenience in light of the particular algorithms used. A dedicated CoAP Option may be used to indicate to a receiving party that decryption of the message should be handled differently to decryption of the ordinary OSCOAP messages, for example requiring the separate decryption of the header and payload. Alternatively, this information may be available in the security association shared between sending and receiving parties.

As noted above, support for the AES-CCM authenticated encryption algorithm is mandatory for OSCOAP. If, for example, the AES-CCM authenticated encryption algorithm is used for encryption/integrity protection of the message payload, then the AES-CBC algorithm may be used for the encryption of the CoAP header parts using the same key and static IV as is used for the AES-CCM algorithm. The CoAP header parts are encrypted separately to any payload encryption, and may be encrypted as part of an initial context negotiation. The encryption of the CoAP header parts is thus not part of the AES-CCM cipher text. However, in order to have integrity protection of the encrypted header parts, the encrypted header parts may then be included with non-encrypted parts of the CoAP header in the additional authenticated data, that is that part of data which is only integrity protected with AES-CCM.

In another example, if AES-CBC encryption is used with digital signatures as integrity protection (for example the Elliptic Curve Digital Signature Algorithm, ECDSA) then AES-CBC may be also used for encryption of CoAP header parts. Normally with AES-CBC the IV used for AES-CBC is sent as the first part of the payload and is then followed by the encrypted part of the payload. In the present example, a separate IV for the encrypted header parts may be included before the encrypted header parts. A separate key may also be used in some examples. The message signature is then generated covering non-encrypted CoAP header parts, encrypted header parts and the payload.

It will be appreciated that the separate encryption of the encrypted header parts and payload discussed above may, depending on the algorithm used, result in a few extra bytes, as each cipher text is a multiple on the algorithm block size. These extra bytes are not visible on the constrained network as the encrypted header parts are replaced with the compression context identifier. The extra bytes are only visible when the complete message is sent, for example over an unconstrained network between the transport node and an application server.

As illustrated in FIG. 3, the CoAP header contains a 2-byte Message ID, which may be used to detect duplicated messages. Message ID is removed with the rest of the CoAP header, and replaced with a compression context identifier according to examples of the present disclosure. In some examples of the present disclosure, sequence numbers may be used by the device and transport node in place of the message ID to detect duplicated messages.

The message ID is also used to match confirmable messages, which may be request or response messages, and non-confirmable messages, with acknowledgements or reset messages being sent in the other direction. A confirmable message is retransmitted until an acknowledge message for the particular message is received. If a confirmable or non-confirmable message cannot be processed, a reset message is sent. In some examples of the present disclosure, sequence numbers may also be used by the device and transport node to restore message IDs when restoring CoAP headers after a message has been transmitted between the device and transport node, for example over a constrained network. As discussed above, sequence numbers may be included in a security association and thus sent as part of a message payload. Sequence numbers are therefore present in messages which have been compressed according to examples of the present disclosure for sending between a device and a transport node.

When a transport node receives a confirmable or non-confirmable message from a server for a device, it may store the message ID of the message before replacing the CoAP header with the appropriate compression context identifier and forwarding the message on to the device. Each message sent by the device via the transport node has an associated device sequence number, the sequence number incremented by one with each new message sent by the device. The transport node orders messages received from the device according to the device sequence number, and processes the messages according to the sequence number order. In this manner, the transport node may match an acknowledgement or reset message sent by the device with the corresponding confirmable or non-confirmable message from the server which triggered the acknowledgement or reset message. When restoring the CoAP header for the acknowledgement or reset message from the device, the transport node may therefore retrieve from memory the message ID included in the original confirmable or non-confirmable message from the server, and may restore this message ID to the acknowledgement or reset message before forwarding the message on to the server.

Conversely, when the device sends a confirmable or non-confirmable message to the server, the transport node may insert its own message ID value as it restores the CoAP header on the basis of the compression context identifier in the message received from the device. On receipt of a corresponding acknowledgement or reset message from the server, the message including a server sequence number incremented with each new message sent by the server, the transport node substitutes the appropriate compression context identifier and forwards the message to the device. The device orders messages received from the transport node according to the server sequence number of the messages, and processes the messages in the sequence number order. On the basis of the ordered messages, and a knowledge of an order of messages forwarded to the transport node for the server, the device may then match the acknowledgement or reset message received from the server via the transport node with a corresponding confirmable or non-confirmable message sent previously by the device.

Sequence numbers may thus be used by the device and transport node to order received messages and match acknowledgement or reset messages to their corresponding confirmable or non-confirmable messages, even when new confirmable or non-confirmable messages are sent by one of the server or device before an acknowledgement or reset message is sent by that party in response to an earlier confirmable or non-confirmable message sent by the other party.

The token field of the CoAP header, illustrated at reference number 12 in FIG. 3, is an optional field which may be used to match responses sent as confirmable or non-confirmable messages with request messages. Many constrained IoT devices are only involved in one simple task and are communicating with very few other devices and servers. In such cases, the same approach as described above for message ID may also be applied for the token field. In brief, upon delivering a request message to the device, the transport node saves the token value from the request message to local memory. The transport node then assumes that the first confirmable or non-confirmable message it receives from the device (based on device sequence number ordering) in which the code indicates it is a response is the response that corresponds to the request message. The transport node then inserts the saved token value from the request into the response CoAP message when restoring the header before forwarding the response message to the server. The device does not require the token field but may use sequence numbers as discussed above to match response messages to their corresponding request messages.

For some IoT devices that are configured to report data, the data they report may be selected from a very limited set. For example, the data may be a mostly constant temperature value or a binary value for a switch. Similarly, payload data sent by a server to a simple device may also be selected from a very limited data set. In such cases, according to some examples of the present disclosure, message payload may be compressed in addition to the CoAP header, and replaced with a payload context identifier. Certain encrypted, or non-encrypted, payloads may be stored during initial context negotiation, and these payloads may then be replaced with an appropriate payload context identifier when messages are sent between a device and transport node. The device and transport node may then restore the appropriate payload on the basis of the payload context identifier. In some examples, the payload context identifier could simply be an additional byte added to the compression context identifier.

As an alternative to agreeing a set of payloads during context setup, a scheme for payload compression may be used in which the payload context identifier indicates that the payload has been left out and is the same as the payload in the previous message. This scheme may be extended by having the transport node buffer several messages and having one additional byte of compression context identifier indicating which of the previous X messages the payload should be restored from. In the case of messages in which the payload is encrypted, in order for a payload compression scheme to be used, the payload encryption scheme should be independent of the sequence number associated with the message. Thus, AES-CBC with explicit Initialisation Vectors and combined with digital signatures would be an appropriate encryption scheme for combination with payload compression. However AES-CCM, in which the Initialisation Vector used for encryption is derived from the static Initialisation Vector of the security association and the sequence number of each message, would not be appropriate for combination with payload compression.

In some examples of the present disclosure, CoAP header compression may be combined with IP and Transport layer compression, as provided by compression schemes such as 6Io and RoHC. For communication between two endpoints, all the headers from MAC layer to application layer are often relatively static, and for further compression, the compression context identifier for the CoAP header may be combined with implicit or explicit context identifiers for the IP and Transport layers, so that only a single identifier is used for both the 6Io/RoHC, CoAP, and in some examples payload compression.

Figure 8:
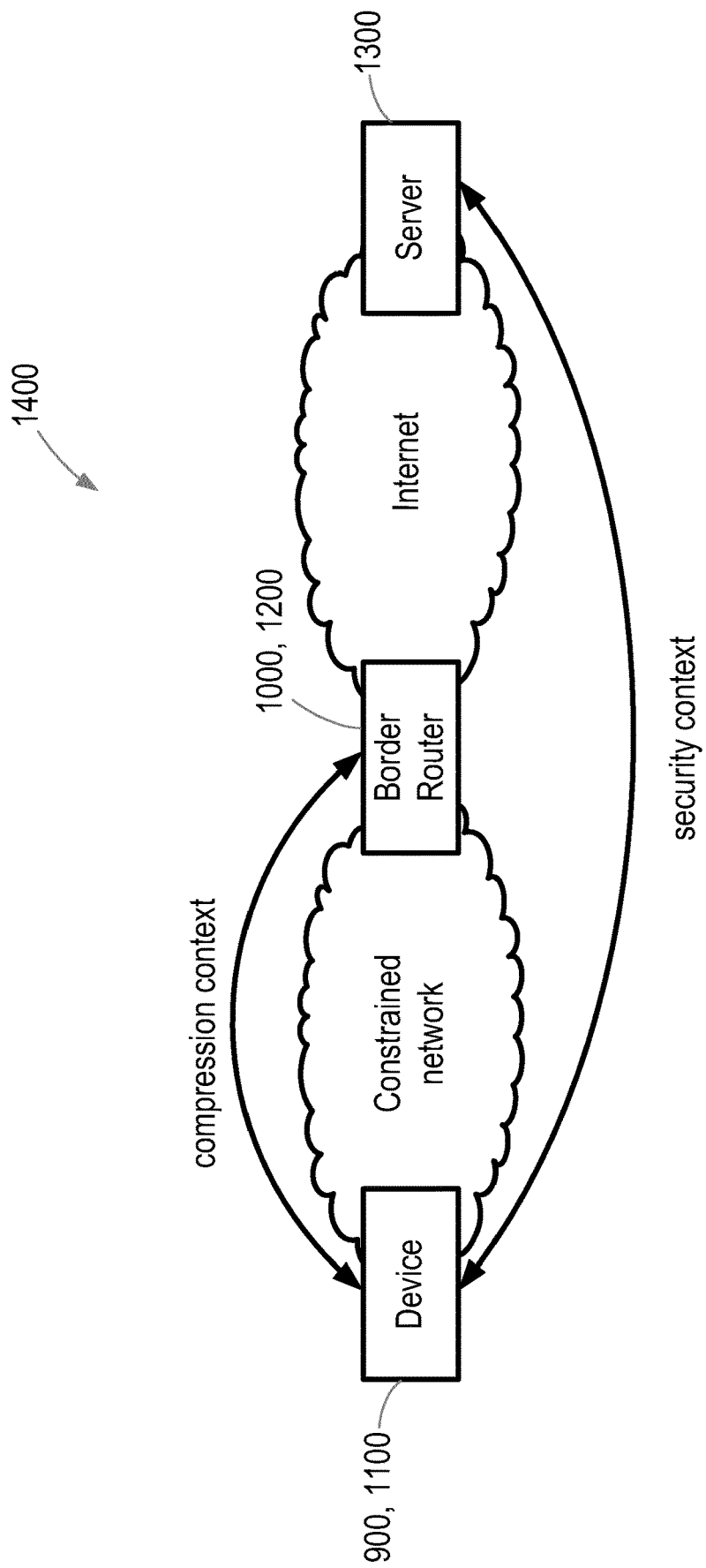
FIG. 8 illustrates a system for communication between a device and a server.

Prior to sending messages compressed using the compression context identifier discussed above, the device and transport node may exchange CoAP headers and compression context identifiers in an initial context negotiation. Whereas a security context is end-to-end, and so negotiated between device and server, the compression context is between the device and the transport node, as illustrated in FIG. 8.

For certain applications, knowledge of suitable contexts may be available when the application is initially configured, for example if communicating endpoints for the application are stable and are known before application configuration. In such cases message exchange using the above discussed compression context identifier may take place without any prior context negotiation.

In a majority of cases however, some kind of signalling may take place to enable context setup. One example mechanism may involve sending full CoAP headers in a first packet with the compression context identifier in subsequent packets containing information as to what, if anything, should be changed from those headers for the packet in question.

In another example, machine learning may be employed for context negotiation. In such cases the same deterministic machine-learning algorithm may be run on the device and transport node. The device and transport node may then signal what should be changed with respect to the prediction of the machine-learning algorithm. A machine-learning method may over time outperform explicit signalling, at the cost of added implementation complexity.

Context negotiation will typically be performed at the beginning of a communication, but may also be performed when there is a re-negotiation of security association, as this will change the encrypted headers. As different key material may be used for the payload to that which is used for the headers, frequency of re-negotiation can be reduced by not automatically changing header key material even if payload key material is updated. Similar mechanisms to those discussed above may be employed for context re-negotiation.

Figure 4:
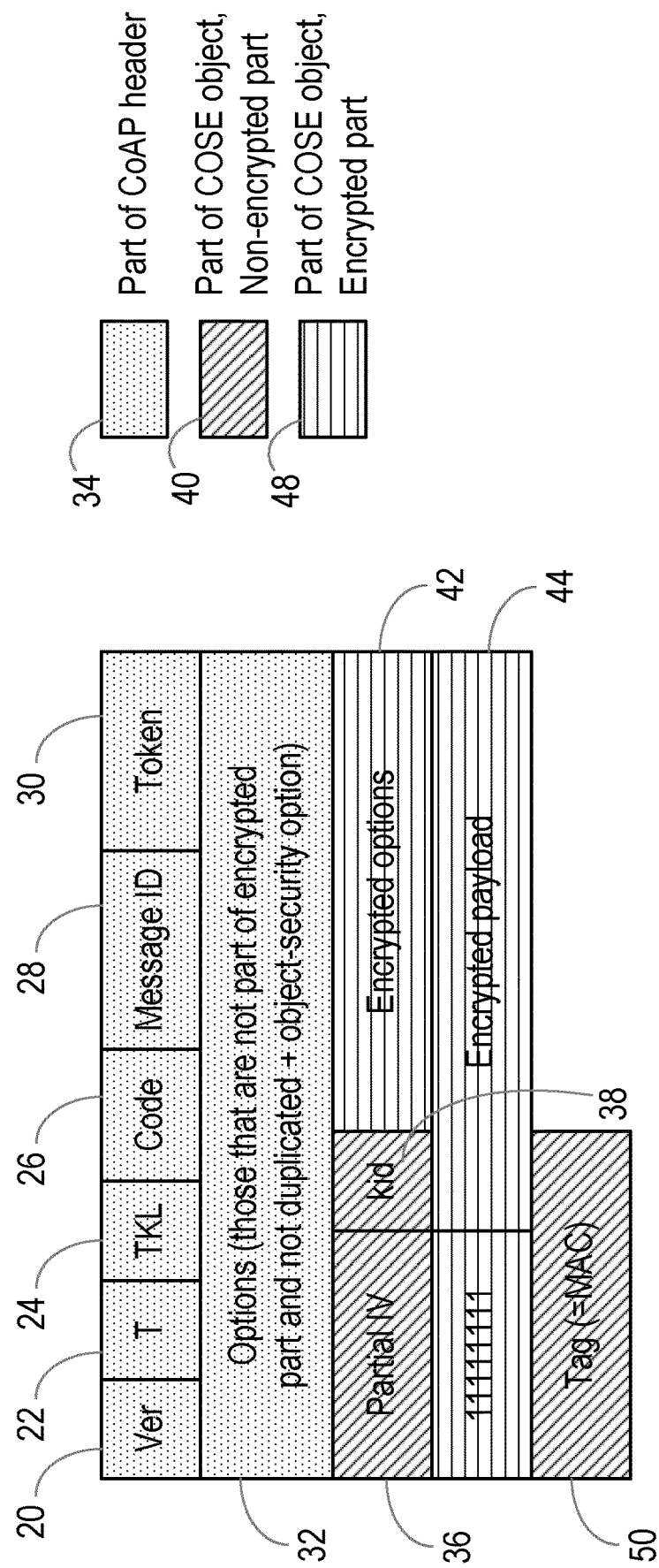
FIG. 4 illustrates an OSCOAP message before compression.
Figure 5:
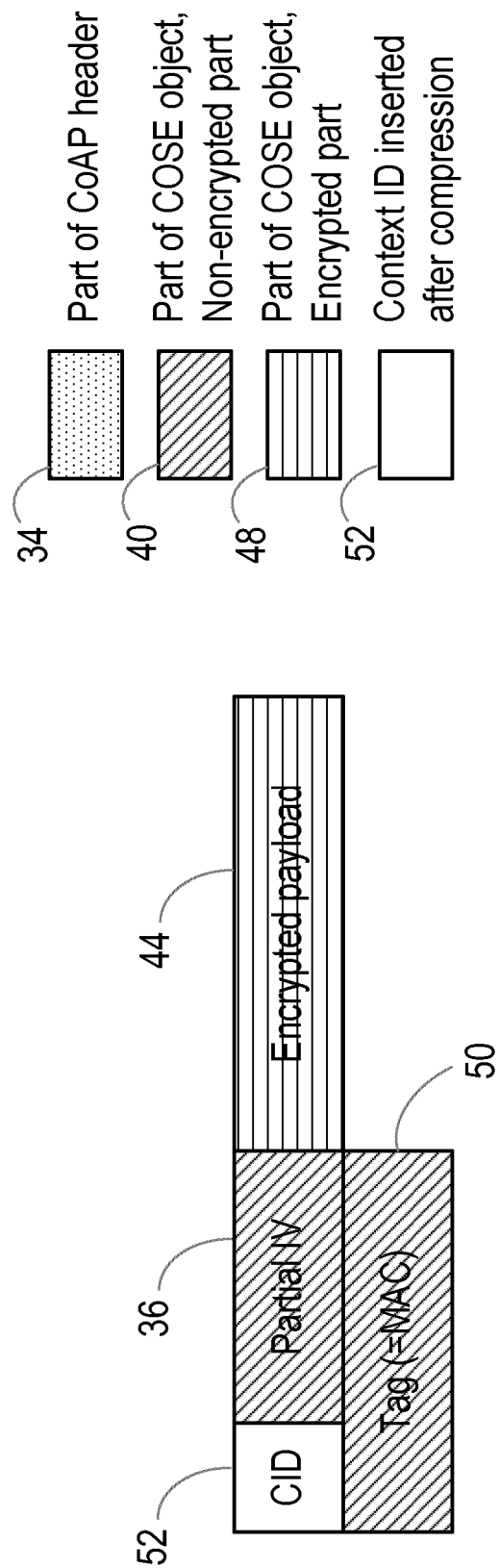
FIG. 5 illustrates an example OSCOAP message after compression.

FIGS. 4 and 5 illustrate how a CoAP message may be compressed according to examples of the present disclosure, using the example of a CoAP message protected using Authenticated Encryption with Additional Data (AEAD) with the AES-CCM algorithm. FIG. 4 illustrates the example message before compression. Reference number 34 indicates those parts of the CoAP header which are not encrypted, including the Version 20 of the protocol, the Type 22 of the message, the Token length 24, the message code 26, the message ID 28, the Token 30 and those Options 32 which are not encrypted, including for example an Option indicating that Object Security is being used to protect the message. Reference numbers 40 and 48 indicate the protected COSE object in CBOR message syntax. The non-encrypted part of the COSE object includes the security association, comprising in the present example a Partial Initialisation Vector 36 and a Key ID 38. The encrypted part of the COSE object comprises the encrypted header Options 42 and the encrypted payload. As discussed above, the encrypted header options and encrypted payload are encrypted separately, and may be encrypted using a different algorithm and/or algorithm parameters. In the present example, the header options are encrypted with AES-CBC and the payload is encrypted with AES-CCM. The non-encrypted part of the COSE object 40 also comprises the signature or MAC 50 of the AES-CCM. This MAC is computed over two first bytes of the CoAP header with Type 22 and Token length 24 set to zero, Partial IV 36, kid 38, encrypted options 42, and encrypted payload 44 (including encrypted 0xFF byte).

FIG. 5 illustrates the CoAP message of FIG. 4 following header compression. The CoAP header, including non-encrypted parts 34, encrypted Options 42 and key ID 38, are removed and replaced with a 1-byte Compression Context Identifier (CID) 52. FIGS. 6 and 7 illustrate further example methods which may be carried out in a device and a transport node. The methods of FIGS. 6 and 7 illustrate one way in which the methods of FIGS. 1 and 2 may be expanded to incorporate some or all of the functionality discussed above.

Figure 6A:
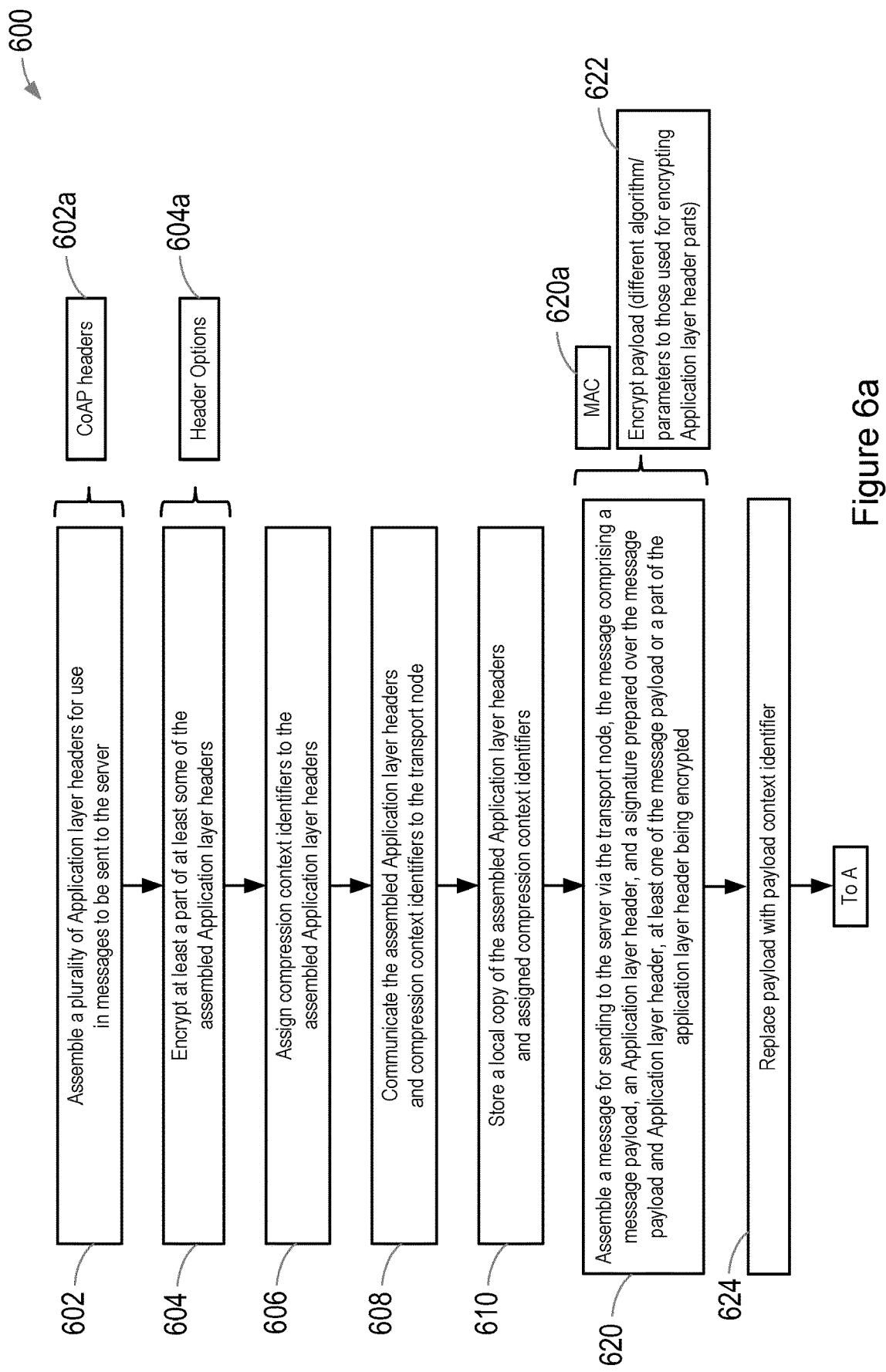
FIGS. 6a and 6b show a flow chart illustrating process steps in another method in a device configured for communication with a server via a transport node of a communication network.

FIG. 6 illustrates process steps in a method 600 conducted in a device configured for communication with a server via a transport node of a communication network. The device may be a constrained device, and the transport node may be a border router or gateway providing Internet access to the device. The device may be one of a plurality of devices within a constrained network. Referring to FIG. 6a, in a first step 602, the device assembles a plurality of application layer headers for use in messages to be sent to the server. As illustrated at 602a, the headers may be CoAP headers. The device then encrypts at least a part of at least some of the assembled application layer headers in step 604. The encrypted parts of the headers may include header Options, as illustrated at 604a. In step 606, the device assigns compression context identifiers to the assembled application layer headers, and in step 608 the device communicates the assembled application layer headers and compression context identifiers to the transport node. The device then stores a local copy of the assembled application layer headers and compression context identifiers in step 610. Steps 602 to 610 thus illustrate an example initial context negotiation from the point of view of the device.

In step 620, the device assembles a message for sending to the server via the transport node, the message comprising a message payload, an application layer header, and a signature prepared over the message payload and application layer header. At least one of the message payload or a part of the application layer header is encrypted. The application layer header may be retrieved from among the stored application layer headers prepared during the context negotiation of steps 602 to 610. As illustrated in 620a, the signature may be a MAC. If the payload of the message is encrypted then the step 620 of assembling the message may further comprise the step 622 of encrypting the message payload, which is thus encrypted separately to the encrypted application layer header, which was encrypted during context negotiation at step 604. The device may use a different algorithm and/or parameters for encryption of the payload to those used to encrypt the encrypted parts of the application layer header. In some examples, the signature or MAC may be created simultaneously with the encryption of the payload. In other examples, the payload may first be encrypted and the MAC created over the message including the encrypted payload. In some examples in which payload compression is used, the device may replace the payload with a payload context identifier in step 624.

Figure 6B:
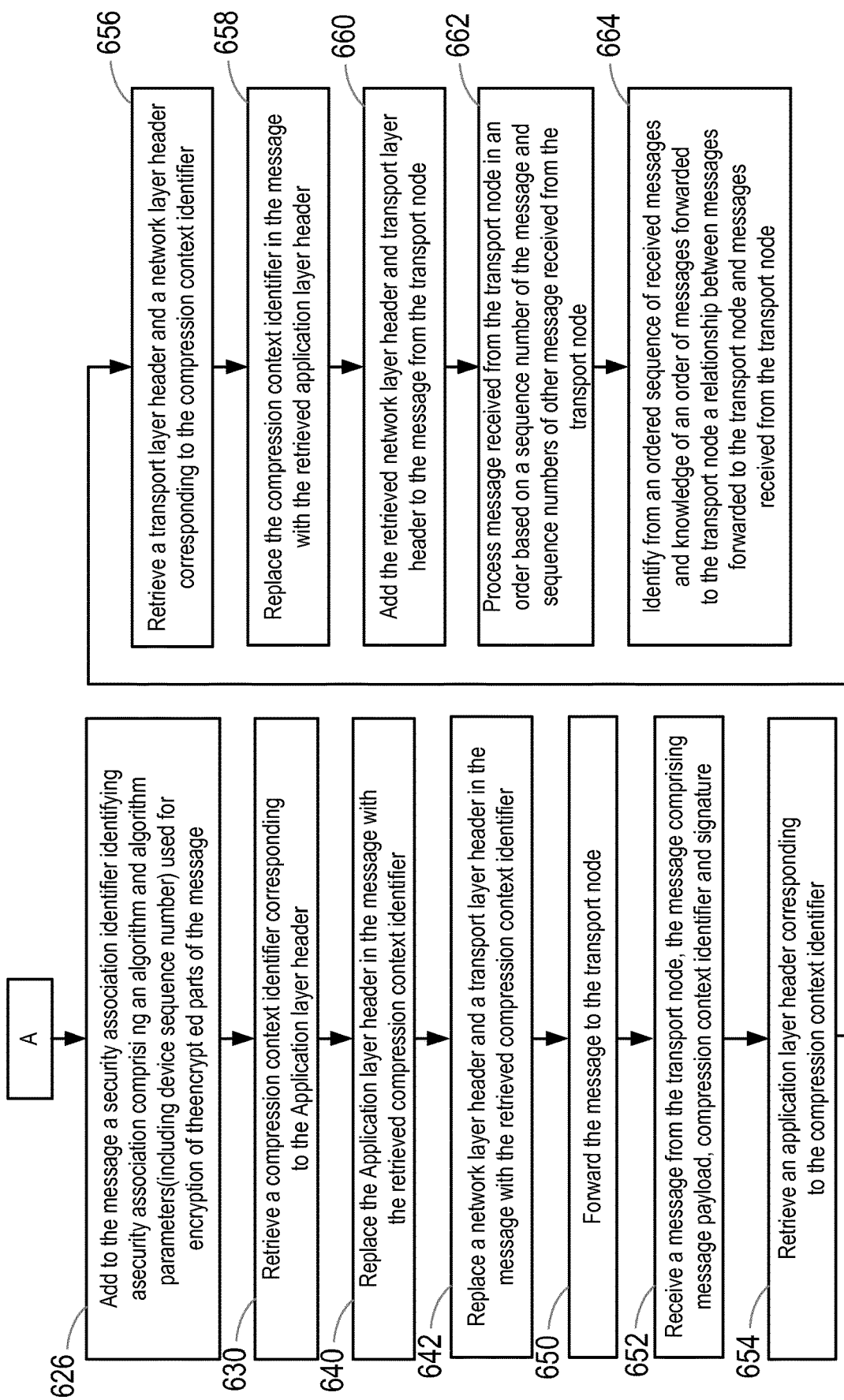

Referring now to FIG. 6b, in step 626, the device adds to the message a security association identifier shared between the sender and the receiver. The identifier identifies a security association comprising an algorithm and algorithm parameters, including device sequence number, used for encryption of the encrypted parts of the message. In step 630, the device retrieves a compression context identifier corresponding to the application layer header for the message from local storage. The device then replaces the application layer header with the retrieved compression context identifier in step 640. In step 642, the device also replaces a network layer header and a transport layer header in the message with the retrieved compression context identifier. The device then forwards the message to the transport node in step 650.

In step 652, the device receives a message from the transport node, the message comprising a message payload, a compression context identifier and a signature. In step 654, the device retrieves an application layer header corresponding to the compression context identifier, and in step 656, the device retrieves a transport layer header and a network layer header corresponding to the compression context identifier. In step 658, the device replaces the compression context identifier with the retrieved application layer header, and in step 660 the device adds the retrieved network and transport layer headers to the message. In step 662, the device processes the message received from the transport node in an order based on a sequence number of the message and sequence numbers of other messages received from the transport node. Finally, in step 664, the device identifies from an ordered sequence of received messages, and knowledge of an order of messages forwarded to the transport node, a relationship between messages forwarded to the transport node and messages received from the transport node. The relationship may for example be between a confirmable or non-confirmable message and a corresponding acknowledgement or reset message.

Figure 7A:
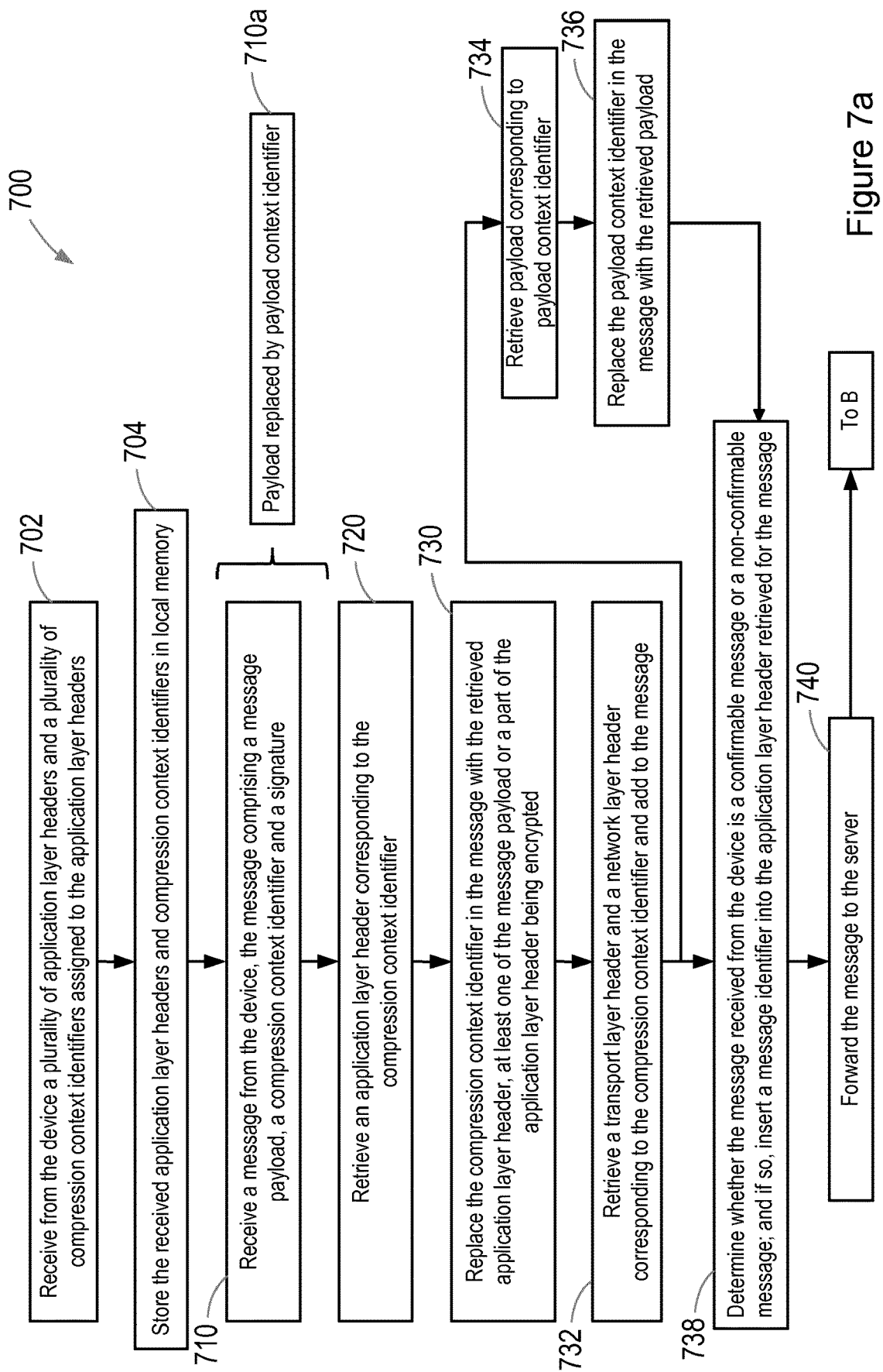
FIGS. 7a and 7b show a flow chart illustrating process steps in another method in a transport node of a communication network.
Figure 7B:
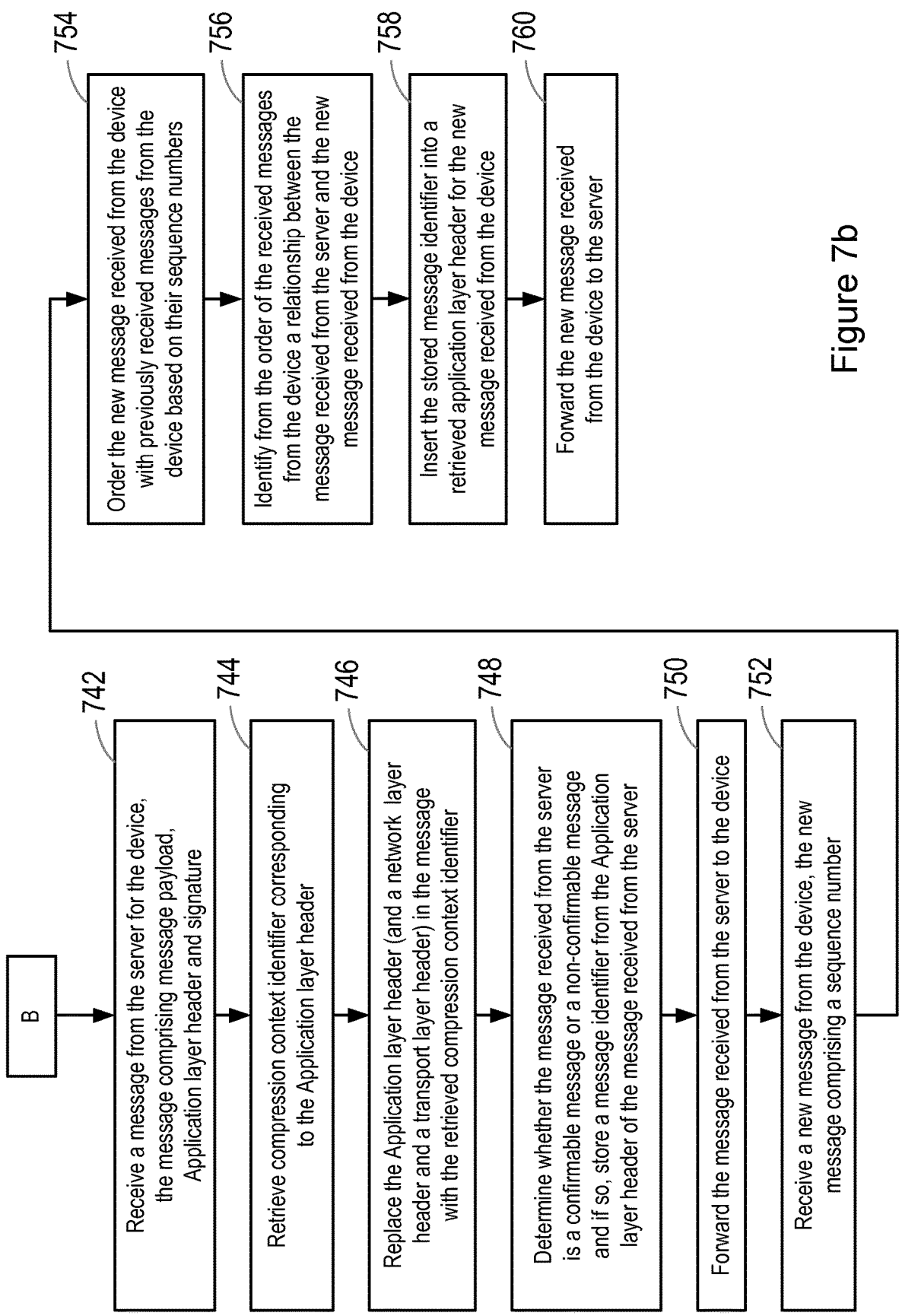

FIG. 7 illustrates process steps in a method 700 performed in a transport node of a communication network, the transport node configured to facilitate communication between a device and a server. The device may be a constrained device, as discussed above, and the transport node may be a border router providing network connectivity to the constrained device. The method 700 comprises steps which are complementary to those of the method 600 performed by the device. Referring to FIG. 7a, in a first step 702, the transport node receives from the device a plurality of application layer headers and a plurality of compression context identifiers assigned to the application layer headers. At least a part of at least some of the application layer headers may be encrypted, and the encrypted parts may be header Options. As discussed above, the application layer headers may be CoAP headers. In step 704, the transport node stores the received application layer headers and compression context identifiers in local memory. Steps 702 and 704 thus represent an example initial context negotiation from the point of view of the transport node.

In step 710, the transport node receives a message from the device, the message comprising a message payload, a compression context identifier and a signature. In some examples, as illustrated at step 710a, the message payload may be replaced by a payload context identifier. In step 720, the transport node retrieves an application layer header corresponding to the compression context identifier from the local storage of step 704, and in step 730, the transport node replaces the compression context identifier in the message with the retrieved application layer header. As discussed above with respect to FIG. 6, at least one of the message payload or a part of the application layer header is encrypted. In step 732, the transport node retrieves a transport layer header and a network layer header corresponding to the compression context identifier and adds the retrieved headers to the received message. In examples in which the message payload is replaced by a payload context identifier, the transport node then retrieves a payload corresponding to the payload context identifier in step 734 and replaces the payload context identifier with the retrieved payload in step 736. As discussed above, the transport node may retrieve a payload from local memory or from an earlier received message stored in a buffer, the payload context identifier indicating which of any earlier received messages the payload should be retrieved from.

In step 738, the transport node determines whether the message received from the device is a confirmable message or a non-confirmable message. If the message is a confirmable message or a non-confirmable message, the transport node inserts a message identifier into the application layer header of the message. In step 740 the transport node then forwards the message to the server. Referring now to FIG. 5b, in step 742, the transport node receives a message from the server for the device, the message comprising a message payload, an application layer header and a signature. The transport node retrieves a compression context identifier corresponding to the application layer header in step 744 and replaces the application layer header in the message with the retrieved compression context identifier in step 746. In some examples, the transport node also replaces a network layer header and a transport layer header of the message with the retrieved compression context identifier. In step 748, the transport node determines whether the message received from the server is a confirmable message or a non-confirmable message. If the message received from the server is a confirmable message or a non-confirmable message, the transport node stores a message identifier from the application layer header of the message in local memory. In step 750, the transport node forwards the message received from the server to the device.

In step 752, the transport node receives a new message from the device, the message comprising a sequence number. The transport node orders the new message received from the device with previously received messages from the device according to the sequence numbers of the received messages in step 754. In step 756, the transport node identifies, from the order of the received messages from the device, a relationship between the message received from the server and the new message received from the device. The relationship may for example be that the new message received from the device is an acknowledgement or reset message corresponding to the confirmable or non-confirmable message received from the server. In step 758, the transport node inserts the stored message identifier from step 748 into a retrieved application layer header for the new message received from the device and in step 760, the transport node forwards the new message received from the device to the server. The message identifier from the confirmable or non-confirmable message received from the server is thus restored into the corresponding acknowledgement or reset message sent from the device, allowing the server to identify the acknowledgement or reset message.

A wide range of use cases for the above discussed methods may be envisaged, reflecting the many deployment scenarios for constrained devices, including their application in "smart" technology for residential, industrial, business, utilities and services sectors. One example use case is in vehicle technology, according to which a range of constrained device sensors may be deployed within a vehicle to monitor performance and report data back to a vehicle manufacturer server. The data may serve for research purposes or to manage vehicle maintenance, program vehicle servicing etc. In order to avoid excessive cabling within the vehicle, the sensors may report data via a constrained radio based local network to a gateway device within the vehicle that provides Internet access and forwards data packets from the sensors to the manufacturer server. The vehicle performance data reported by the sensors may be commercially sensitive, and end-to-end security may therefore be required, including encryption of at least some parts of the messages containing the reported data. Compression of the messages when sent over the constrained network between the sensors and the gateway is desirable, to enable the use of small frame sizes and maximise battery life of the sensors. The above discussed methods for communication between a constrained device (sensor), transport node (in-vehicle gateway) and server (vehicle manufacturer server) may therefore be employed to beneficial effect.

Figure 9:
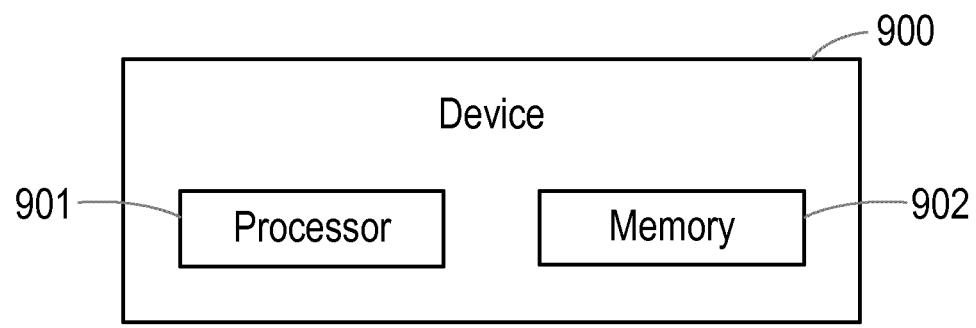
FIG. 9 is a block diagram illustrating functional units in a device.
Figure 10:
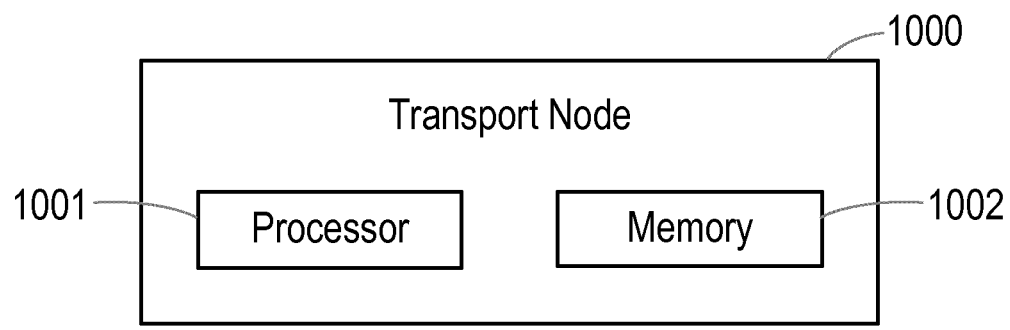
FIG. 10 is a block diagram illustrating functional units in a transport node.

As discussed above, the methods 100 and 600 may be carried out by a device which may be a constrained device. The methods 200 and 700 may be carried out by a transport node, which may for example be a border router or gateway. FIG. 9 illustrates an example device 900 which may implement the methods 100, 600 for example on receipt of suitable instructions from a computer program. Referring to FIG. 9, the device 900 comprises a processor 901 and a memory 902. The memory 902 contains instructions executable by the processor 901 such that the device 900 is operative to conduct some or all of the steps of the methods 100 and/or 600. FIG. 10 illustrates an example transport node 1000 which may implement the methods 200, 700 for example on receipt of suitable instructions from a computer program. Referring to FIG. 10, the transport node 1000 comprises a processor 1001 and a memory 1002. The memory 1002 contains instructions executable by the processor 1001 such that the transport node 1000 is operative to conduct some or all of the steps of the methods 200 and/or 700.

Figure 11:
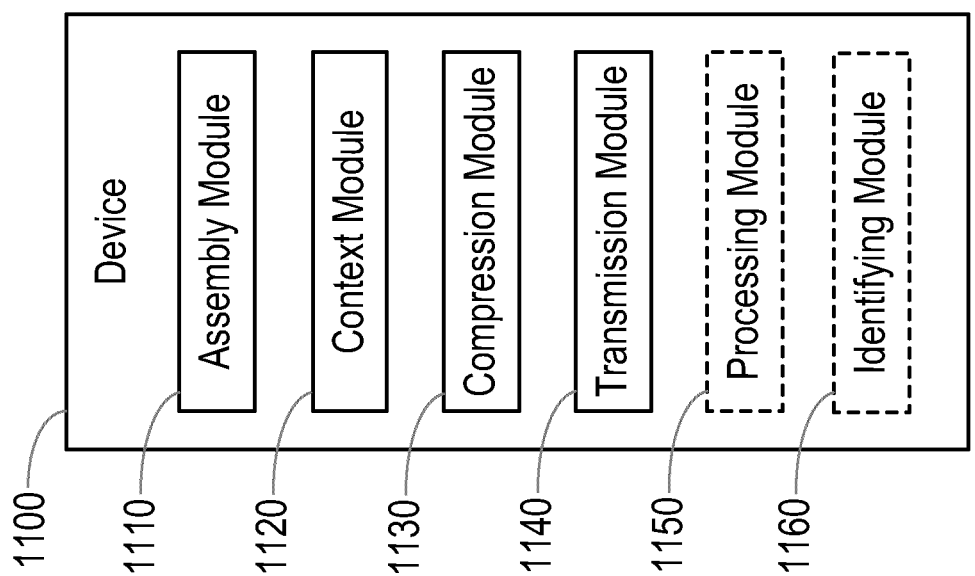
FIG. 11 is a block diagram illustrating functional units in another example of device.

FIG. 11 illustrates an alternative example device 1100, which may implement the methods 100, 600, for example on receipt of suitable instructions from a computer program. The device 1100 may for example be a constrained device and may be configured to communicate with a server via a transport node of a communication network. It will be appreciated that the units illustrated in FIG. 11 may be realised in any appropriate combination of hardware and/or software. For example, the units may comprise one or more processors and one or more memories containing instructions executable by the one or more processors. The units may be integrated to any degree.

Referring to FIG. 11, the device 1100 comprises an assembly module 1110 for assembling a message for sending to the server via the transport node, the message comprising a message payload, an application layer header, and a signature prepared over the message payload and application layer header, wherein at least one of the message payload or a part of the application layer header is encrypted. The device 700 further comprises a context module 1120 for retrieving a compression context identifier corresponding to the application layer header, and a compression module 1130 for replacing the application layer header in the message with the retrieved compression context identifier. The device 1100 further comprises a transmission module 1140 for forwarding the message to the transport node. In some examples of the present disclosure, the message received from the transport node may be one of a plurality of messages received from the transport node, and the message forwarded to the transport node may be one of a plurality of messages forwarded to the transport node, and each message forwarded to the transport node and each message received from the transport node may further comprise a sequence number. The device 1100 may further comprise a processing module 1150 for processing messages received from the transport node in an order based on their sequence numbers, and an identifying module 1160 for identifying from an ordered sequence of received messages and knowledge of an order of messages forwarded to the transport node a relationship between messages forwarded to the transport node and messages received from the transport node.

Figure 12:
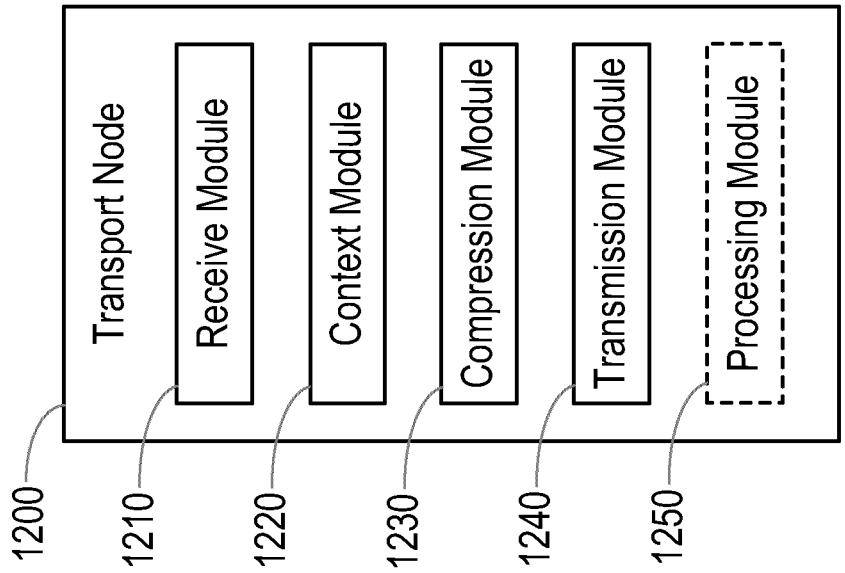
FIG. 12 is a block diagram illustrating functional units in another example of transport node.

FIG. 12 illustrates an alternative example transport node 1200, which may implement the methods 200, 700, for example on receipt of suitable instructions from a computer program. The transport node 1200 may for example be a border router or gateway and may be configured to facilitate communication between a device and a server. It will be appreciated that the units illustrated in FIG. 12 may be realised in any appropriate combination of hardware and/or software. For example, the units may comprise one or more processors and one or more memories containing instructions executable by the one or more processors. The units may be integrated to any degree.

Referring to FIG. 12, the transport node 1200 comprises a receiving module 1210 for receiving a message from the device, the message comprising a message payload, a compression context identifier and a signature. The transport node further comprises a context module 1220 for retrieving an application layer header corresponding to the compression context identifier, and a compression module 1230 for replacing the compression context identifier in the message with the retrieved application layer header. The transport node further comprises a transmission module 1240 for forwarding the message to the server, wherein at least one of the message payload or a part of the application layer header is encrypted. In some examples of the present disclosure, the message received from the device may be one of a plurality of messages received from the device, each of the received messages from the device comprising a sequence number, and the application layer header in the message received from the server may comprise a message identifier and a sequence number. The transport node may further comprise a processing module 1250 for determining whether the message received from the server is a confirmable message or a non-confirmable message; and, if the message received from the server is a confirmable message or a non-confirmable message, storing the message identifier. The receiving module 1210 may also be for receiving a new message from the device, the new message comprising a sequence number, and the processing module 1250 may also be for ordering the new message received from the device with previously received messages from the device based on their sequence numbers, identifying from the order of the received messages from the device a relationship between the message received from the server and the new message received from the device and inserting the stored message identifier into a retrieved application layer header for the new message received from the device. The transmission module 1240 may also be for forwarding the new message received from the device to the server.

Examples of the device 900, 1100 and transport node 1000, 1200 may be combined with a server 1300 to form a system 1400 for communication between a device and a server over a communication network, as illustrated in FIG. 8. In accordance with the above discussion, the device 900, 1100 is configured to assemble a message for sending to the server via the transport node, the message comprising a message payload, an application layer header, and a signature prepared over the message payload and application layer header, wherein at least one of the message payload or a part of the application layer header is encrypted. The device 900, 1100 is further configured to retrieve a compression context identifier corresponding to the application layer header, replace the application layer header in the message with the retrieved compression context identifier, and forward the message to the transport node. The transport node 1000, 1200 is configured to receive the message from the device, retrieve the application layer header corresponding to the compression context identifier, replace the compression context identifier in the message with the retrieved application layer header, and forward the message to the server.

Aspects of the present disclosure thus provide methods according to which Object Security for CoAP may be used to protect CoAP messages in such a manner that application layer message compression may be applied. Object security is applied such that sensitive parts of the CoAP message header are encrypted separately, and may be encrypted using a different algorithm and/or algorithm parameters, from the payload. In this manner, predefined CoAP headers may be combined with different payloads and may be removed and replaced with compression context identifiers for sending between a device and transport node.

In a compression context negotiation, the device may communicate to the transport node all CoAP headers it intends to use together with assigned compression context identifiers for the CoAP headers. When the device is preparing to send a CoAP message, the device sends only the payload and the compression context identifier for the corresponding CoAP header, together with a signature prepared over the whole message of header and payload. The transport node adds the appropriate CoAP header to the received packet based on the compression context identifier, calculates any required dynamic values and adds them to the header, and forwards the message to the destination server. When the transport node receives messages from a server including CoAP headers that match with the context of one of the stored compression context identifiers, it replaces the CoAP headers with the appropriate compression context identifier before sending the message forward to the device.

In some examples of the present disclosure, the compression context identifier may include 610 or RoHC context identifiers, allowing for IPv6, UDP, and CoAP headers to be compressed using the same compression context identifier.

Examples of the present disclosure thus enable compression of secured application layer data. As the compression context identifier, of approximately 1 byte, comprises much less data than a full application layer header, which may comprise tens of bytes, considerable bandwidth is saved, so offering significant advantages, particularly for use in constrained networks in which very small frame sizes may be used. Additionally, the lifetime of battery operated devices may be increased by the reduction in the amount of data for transmission when sending messages to a transport node.

The methods of the present disclosure operate so as to be transparent to network servers with which devices may be communicating, the servers remaining unaware that compression may be used when messages are forwarded between a device and a transport node.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by a device configured for communication with a server via a transport node of a communication network, the method comprising:
assembling a Constrained Application Protocol (CoAP) message for sending to the server via the transport node, the CoAP message using Object Security for end-to-end protection between the device and the server and comprising a message signature, a payload that is encrypted, and a CoAP header that is partially encrypted separately from encryption of the payload;
retrieving a compression context identifier corresponding to the CoAP header;
replacing the partially encrypted CoAP header in the CoAP message with the retrieved compression context identifier, to impose header compression on the CoAP message for forwarding of the CoAP message to the transport node;

retrieving a payload context identifier corresponding to the encrypted payload;

replacing the encrypted payload with the payload context identifier, to impose payload compression on the CoAP message forwarding the CoAP message to the transport node; and forwarding the CoAP message to the transport node.

2. The method as claimed in claim 1, wherein the CoAP header includes an indication that the CoAP message uses Object Security and wherein the indication is in an unencrypted part of the CoAP header.

3. The method as claimed in claim 1, further comprising:
assembling a plurality of CoAP headers for use in messages to be sent to the server;
assigning respective compression context identifiers to the assembled CoAP headers; and
communicating the assembled CoAP layer headers and the respective compression context identifiers to the transport node.

4. The method as claimed in claim 1, wherein the CoAP message further includes a security association identifier identifying a security association comprising an algorithm and algorithm parameters used for encryption of the encrypted parts of the CoAP message.

5. The method as claimed in claim 1, wherein the retrieved compression context identifier also replaces a network layer header and a transport layer header of the CoAP message.

6. The method as claimed in claim 1, further comprising:
receiving a further CoAP message from the transport node, the further CoAP message comprising:
a payload context identifier,
a compression context identifier, and
a signature; and
processing the further CoAP message by:
retrieving an encrypted message payload corresponding to the payload context identifier;
decrypting the encrypted message payload to obtain the message payload corresponding to the further CoAP message;
retrieving a CoAP header corresponding to the compression context identifier, the CoAP header being partially encrypted, where the encryption applied to the CoAP header is separate from the encryption applied to the message payload; and
decrypting the encrypted part of the CoAP header to obtain all CoAP header information of the further CoAP message.

7. A method performed by a transport node of a communication network, the transport node configured to facilitate communication between a device and a server, the method comprising:
receiving a Constrained Application Protocol (CoAP) message from the device, the CoAP message targeting the server and using Object Security for end-to-end protection between the device and the server, the CoAP message comprising a message signature and a compression context identifier, and a payload context identifier;
retrieving an encrypted message payload corresponding to the payload context identifier;
replacing the payload context identifier in the CoAP message with the encrypted message payload, for forwarding of the CoAP message towards the server;
retrieving a CoAP header corresponding to the compression context identifier, the CoAP header being partially encrypted, with the encryption of the CoAP header being separate from the encryption of the message payload;
replacing the compression context identifier in the CoAP message with the CoAP header, for forwarding of the CoAP message towards the server; and
forwarding the CoAP message to the server.

8. The method as claimed in claim 7, further comprising:
receiving from the device a plurality of CoAP headers and respective compression context identifiers assigned to the CoAP headers; and
storing the plurality of CoAP headers and the respective compression context identifiers in local memory.

9. The method as claimed in claim 7, further comprising:
retrieving a transport layer header and a network layer header corresponding to the compression context identifier; and
adding the retrieved network layer header and transport layer header to the CoAP message, for forwarding of the CoAP message towards the server.

10. The method as claimed in claim 7, further comprising:
determining whether the CoAP message is a confirmable message or a non-confirmable message; and
in response to determining that the CoAP message is a confirmable message, inserting a message identifier into the CoAP header, for forwarding of the CoAP message towards the server.

11. The method as claimed in claim 7, further comprising:
receiving a further CoAP message from the server for the device, the further CoAP message comprising a message payload, a CoAP header, and a signature prepared over the message payload and the CoAP header, and where server partially encrypted the CoAP header separately from encryption applied by the server to the message payload;
retrieving a payload context identifier corresponding to the message payload;
replacing the message payload in the further CoAP message with the payload context identifier, to impose payload compression on the further CoAP message for forwarding of the further CoAP message to the device;
retrieving a compression context identifier corresponding to the CoAP header;
replacing the CoAP header in the further message with the retrieved compression context identifier, to impose header compression on the further CoAP message for forwarding of the further CoAP message to the device; and
forwarding the further CoAP message to the device.

12. A device configured for communication with a server via a transport node of a communication network, the device comprising:
a processor; and
a memory, the memory containing instructions executable by the processor such that the device is operative to:
assemble a Constrained Application Protocol (CoAP) message for sending to the server via the transport node, the CoAP message using Object Security for end-to-end protection between the device and the server and comprising a message signature, a message payload that is encrypted, and a CoAP header that is partially encrypted separately from encryption of the message payload;
retrieve a payload context identifier corresponding to the encrypted message payload;

replace the encrypted message payload in the CoAP message with the payload context identifier, to impose payload compression on the CoAP message for forwarding of the CoAP message to the transport node;

retrieve a compression context identifier corresponding to the CoAP header;

replace the CoAP header in the CoAP message with the retrieved compression context identifier, to impose header compression on the CoAP message for forwarding of the CoAP message to the transport node; and forward the CoAP message to the transport node.

13. A transport node of a communication network, the transport node configured to facilitate communication between a device and a server, the transport node comprising:

a processor; and a memory, the memory containing instructions executable by the processor such that the transport node is operative to:

receive a Constrained Application Protocol (CoAP) message from the device, the CoAP message targeting the server and using Object Security for end-to-end protection between the device and the server, the CoAP message comprising a message signature, a payload context identifier, and a compression context identifier;

retrieve an encrypted message payload corresponding to the payload context identifier;

replace the payload context identifier in the CoAP message with the encrypted message payload, for forwarding of the CoAP message towards the server;

retrieve a CoAP header corresponding to the compression context identifier, the CoAP header being partially encrypted, with the encryption of the CoAP header being separate from encryption applied to the message payload;

replace the compression context identifier in the CoAP message with the CoAP header, for forwarding of the CoAP message towards the server; and forward the CoAP message to the server.

* * * * *